United States Patent [19]
Bauer et al.

[11] Patent Number: 5,794,166
[45] Date of Patent: Aug. 11, 1998

[54] METHOD FOR DETERMINING SLIPPAGE OF AN AUTONOMOUS MOBILE UNIT WITH THREE-WHEEL KINEMATICS

[75] Inventors: Rudolf Bauer, Neubiberg; Wolfgang Rencken, Erding, both of Germany

[73] Assignee: Siemens Aktiengesellschaft, Munich, Germany

[21] Appl. No.: 660,429

[22] Filed: Jun. 7, 1996

[30] Foreign Application Priority Data

Jun. 12, 1995 [DE] Germany .................. 195 21 358.0

[51] Int. Cl.$^6$ .......................... G05D 01/02; G06G 07/78
[52] U.S. Cl. ..................... 701/23; 701/26; 318/587
[58] Field of Search ..................... 701/22, 23, 26, 701/70, 217; 38/587

[56] References Cited

U.S. PATENT DOCUMENTS

| | | | |
|---|---|---|---|
| 4,437,533 | 3/1984 | Bierkarre et al. | 318/587 |
| 4,852,677 | 8/1989 | Okazaki | 180/169 |
| 5,111,401 | 5/1992 | Everett, Jr. et al. | 318/568.12 |
| 5,233,526 | 8/1993 | Detriche et al. | 701/23 |
| 5,243,524 | 9/1993 | Ishida et al. | |
| 5,456,332 | 10/1995 | Borenstein | 180/167 |
| 5,684,695 | 11/1997 | Bauer | 701/23 |

FOREIGN PATENT DOCUMENTS 0 635 773 A2  1/1995  European Pat. Off. .

OTHER PUBLICATIONS

Smith et al, "On the Representation and Estimation of Spatial Uncertainty", *The International Journal of Robotics Research*, vol. 5, No. 4, Winter 1986, pp. 56–68.

Cox, "Blanche—An Experiment in Guidance and Navigation of an Autonomous Robot Vehicle", *IEEE Transactions on Robotics and Automation*, vol. 7, No. 2, Apr. 1991, pp. 193–204.

Rencken, "concurrent Localisation and Map Building for Mobile Robots Using Ultrasonic Sensors", *Proceedings of the 1993 IEEE/RSJ International Conference on Intelligent Robots and Systems*, Yokohama, Japan, 1993, pp. 2192–2197.

Bauer, "Berücksichtigung von Selbstlokalisierung und Landmarkenaufbau bei der Bahnplanung", Fachgespräch Autonome Mobile Systeme, Stuttgart, P. Levi, Th. Bräunl (Hrsg.) Springer Verlag, Berlin Heidelberg, New York, pp. 296–305, 1994.

*Primary Examiner*—Virna Lissi Mojica
*Attorney, Agent, or Firm*—Hill & Simpson

[57] ABSTRACT

A method is provided for improving the localization of a robot autonomous mobile unit. A slippage is predicted along a path that the unit is to traverse may be predicted, in that a simplified absolute path trajectory is determined, and based on the unit geometry and motion behavior of three-wheel kinematics, an imaginary slippage derives in the end position. This imaginary slippage can be calculated for various end positions and the most beneficial travel path can thus be selected from a starting point.

8 Claims, 4 Drawing Sheets

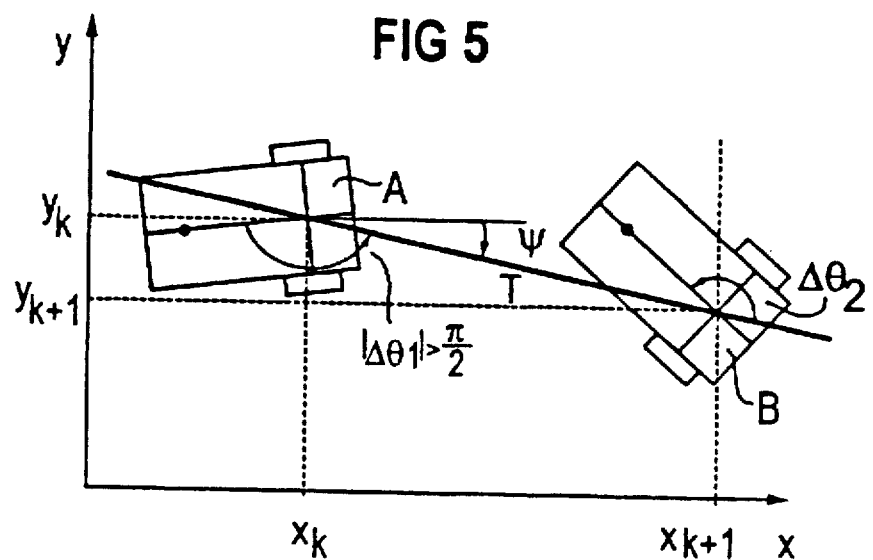
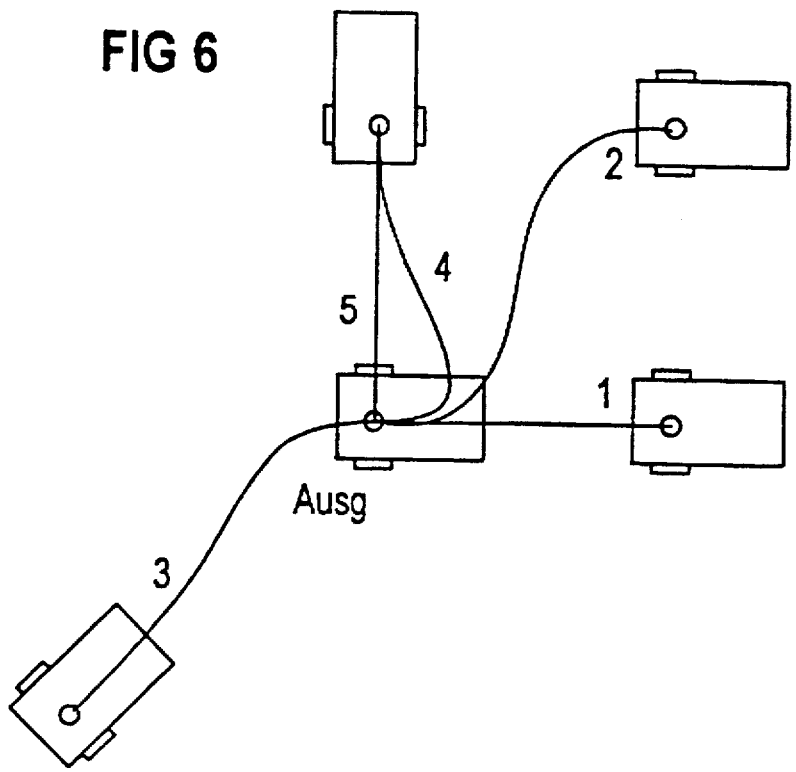

METHOD FOR DETERMINING SLIPPAGE OF AN AUTONOMOUS MOBILE UNIT WITH THREE-WHEEL KINEMATICS

BACKGROUND OF THE INVENTION

The present invention relates to positional determination and slippage compensation in autonomous mobile units such as robots and driverless transport systems.

Increasing automation in households and industry promotes the use of autonomous, mobile units. For example, such automated units include industrial vacuum cleaners, transport vehicles in manufacturing environments and movable multi-purpose robots. However, a problem exists with such units in that the condition of their environment can change rapidly in a short time. Robotic units must, therefore, orient themselves in an unknown environment. This is usually done by generating a map within which the robot then orients itself with sensors to localize itself relative to the map at any point in time. Exact robot positioning and orientation information (its "configuration") is a necessity for many robot jobs. For cost reasons it is advantageous to identify the proper position with robot-contained internal sensors, e.g., distance sensors at the wheels or audiometry, as opposed to external auxiliaries, e.g., GPS systems or artificial marks.

A rough estimate of the configuration is possible with audiometry data. Unfortunately, however, due to slippage of the wheels, the configuration estimate becomes poorer and poorer over the course of time. When a mobile system is to operate autonomously over a longer time span, then both the proper position as well as the uncertainty thereof must be continuously estimated.

The procedure of the robot or autonomous mobile unit (the terms are interchangeable as used herein) for orienting itself during travel and simultaneously constructing a map of the environment is problematic in that the map formation and robot localization are dependent on each another. Particularly important factors in this problem are the type and the position of the sensors employed by the unit to measure the traversed distance or to detect obstacles existing in the environment. For example, the distance traversed from a starting point is measured by a wheel sensor, and the distance from obstacles is measured with range sensors. The measured results are entered into the map as landmarks. Due to the interactive dependencies of the measuring events for distance traveled and obstacle range determination, the occurring measurement errors accumulate over the course of travel. Slippage occurring at the wheels plays a particularly important a part in conjunction with the distance measurement because it can lead to a direct error in the distance measurement.

In practice, a three-wheel design is often used in autonomous mobile units (motor vehicles, vacuum cleaners, etc.). Therefore, the orientation problems discussed above have been closely investigated with respect to the geometrical dependencies of three-wheeled kinematics.

The problem of inadequate orientation or the accumulation of measured errors occurring during travel has been investigated as reported in W. D. Rencken, *Concurrent Localization and Map Building for Mobile Robots Using Ultrasound Sensors*, Proc. of IEEE Int. Conf. of Intelligent Robots and Systems, pp. 2192–97, Yokohama, Japan (1993). That study proposes that a robot's configuration (its momentary position) may be improved because measured errors occurring at the individual measuring instruments are divided onto the measuring imprecision—which can be identified—according to their absolute size. The momentary configuration of the robot can thus be more exactly identified.

Given small changes in the configuration (position and orientation) there are also suggestions in R. C. Smith and P. Cheeseman, *On the Representation and Estimation of Spatial Uncertainty*, Int. J. of Robotics Research, Vol. 5, No. 4, pp. 56–68 (1986) to assume a Gaussian distribution for the estimated error and to represent the configuration uncertainty distribution as an ellipsoid. Particularly in conjunction with the path planning of an autonomous mobile unit, the optimal path on which the unit should beneficially move in order to minimize its positional uncertainty should really be known in advance. The publication R. Bauer, *Berücksichtigung von Selbstlokalisierung und Landmarkenaufbau bei der Bahnplanung*, 10. Fachgespräch Autonome Mobile Systeme, Stuttgart, P. Levi, Th. Bräunl (Hrsg.), Springer Verlag, Berlin Heidelberg, New York, pp. 296–305 (1994) discloses a method therefore. In that method, a plurality of mutually independent sub-jobs are prescribed for an autonomous mobile unit, wherein the sub-job execution is determined by cost functions. One of these sub-jobs is keeping the positional uncertainty of the autonomous mobile unit within a defined limit. For example, in order to meaningfully handle such a sub-job, the cumulative slippage over a specific distance must be estimated in advance.

Therefore, an object of the present invention is to provide a method for an autonomous mobile unit to identify the slippage that accumulates on its travel path during travel from the starting point to a destination point.

SUMMARY OF THE INVENTION

The present invention achieves the object by providing an improved method for calculating slippage of a robot or an autonomous mobile unit with three-wheel kinematics. In an embodiment, the method generally includes predicting a cumulative overall slippage to be incurred in traversing a travel distance from a starting point to a destination point along an imaginary absolute motion path of the unit. This imaginary absolute motion path usually includes three components: 1) a first rotation of the unit of the starting point by a first rotational angle selected such that the unit is directed toward the destination point after the first rotation; 2) forward travel of the unit of a distance from the starting point to the destination point; and 3) a second rotation of the unit at the destination point at a second rotational angle selected such that the unit assumes a rotational position required at the destination point after the second rotation. Also, the method includes calculating an overall slippage per wheel of the unit based on at least one distance-dependent prescribed slippage. To determine this, the imaginary travel distance of each wheel is calculated based on dimensions between wheels of the unit (e.g., the distance between the wheels of a two-wheel-drive three wheeled unit) in conjunction with geometrical behaviors of three-wheel kinematics and multiplying the imaginary travel distance by the prescribed slippage.

For traveling in reverse, the method includes subtracting the first and the second rotational angle from $\pi$.

In an advantageous embodiment, the prescribed slippage is weighted with a Gaussian distribution. Preferably, this Gaussian distribution has a standard deviation greater than a maximum value of the Gauss curve in order to compensate for uncertainties in the real travel execution. For example, the standard deviation may be selected at a value greater than the normal slippage on a smooth floor.

Preferably, the distance between starting point and destination point is at least a length of the unit.

The invention also provides a method for route planning of an autonomous mobile unit, whereby sub-jobs to be implemented and to be planned by the unit are defined by cost functions. This method includes monitoring or correcting a position uncertainty of the unit with at least one sub-job. In this variation also, the overall slippage per wheel of the unit is calculated based on at least one distance-dependent prescribed slippage wherein the imaginary absolute travel distance of each wheel is calculated based on dimensions between wheels of the unit in conjunction with three-wheel kinematics and is multiplied by the prescribed slippage.

A particular advantage of the invention is to determine the slippage of a relatively long distance with one calculating operation, wherein an interaction between rotation and translation is explicitly taken into account. The inventive method thus allows a planning of robot trips to be implemented in advance, taking the configuration uncertainty caused by slippage into consideration. Furthermore, the inventive method advantageously enables a saving of calculating time since the mode of calculation is kept simple.

An advantage of the method of the invention is that different conditions given forward travel and reverse travel of a unit driven with three-wheel kinematics are considered. For simplifying the slippage calculation, a Gaussian distribution of the slippage is also advantageously assumed.

The Gaussian distribution is especially advantageously selected in the inventive method such that the standard deviation is greater than the maximum amount of the Gauss curve in order to take into account uncertainties that arise given differing floor properties and shape irregularities. The standard deviation is thereby especially advantageously selected greater than the normal slippage on a smooth floor.

The inventive method is especially advantageous for longer distances, i.e., distances that are greater than the unit itself, since no methods are currently available therefor.

The inventive method is especially advantageously when utilized for higher-ranking route planning of an autonomous mobile unit wherein sub-jobs are implemented dependent on cost functions in order to designationally evaluate in advance those costs which arise due to a selected route and in the accumulated slippage. It is thus possible to implement a more precise analysis of the greatest variety of routes taking this aspect into consideration.

Additional features and advantages of the present invention are described in, and will be apparent from, the detailed description of the preferred embodiments and from the drawings.

BRIEF DESCRIPTION OF THE DRAWINGS

FIG. 5 is a plan view of an autonomous mobile unit operating according to the present invention as shown on a two-dimensional configuration plot, illustrating the difference between forward and reverse travel.

FIG. 6 is a schematic plan view of an autonomous mobile unit at an example starting position and plurality of end positions to be investigated according to the present invention.

DETAILED DESCRIPTION OF THE PREFERRED EMBODIMENTS

Figure 1:
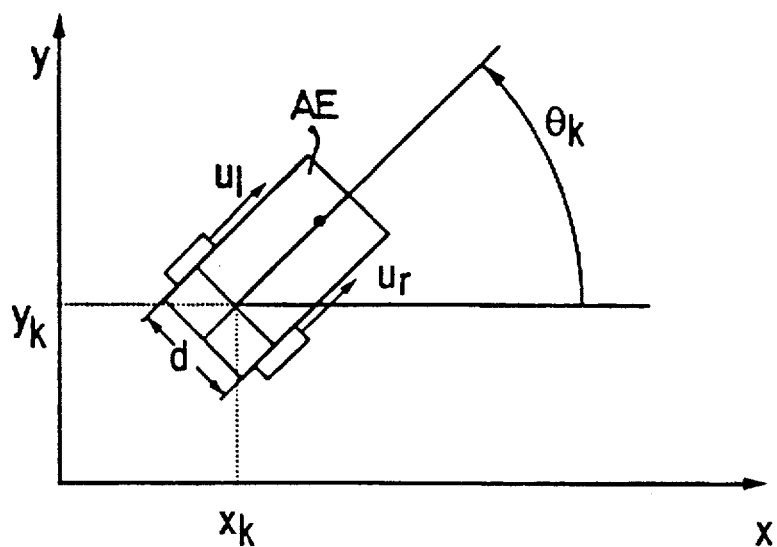
FIG. 1 is a schematic plan view of an autonomous mobile unit, the view, showing its configuration as dimensionally positioned on a two-dimensional plot.

For configuration identification and motion modeling, the invention, as shown in FIG. 1, is based on an autonomous system in the form of a vehicle AE having two rear wheels driven independently of one another. Kinematically, this type of drive corresponds to the most widely used three-wheel kinematics, as in the case of autos and many mobile robots. FIG. 1 thereby defines the motion model of such an autonomous vehicle relative to a two-dimensional plot. The FIGS. illustrate the kinematic conditions of three-wheel kinematics, however, the invention is not limited in application exclusively to such vehicles.

Only small changes of the configuration (position and orientation) can be estimated with the following equations:

$$x_{k+1} = x_k + \frac{u_{rk} + u_{lk}}{2} \cos(\theta_k) \quad (1)$$

$$y_{k+1} = y_k + \frac{u_{rk} + u_{lk}}{2} \sin(\theta_k)$$

$$\theta_{k+1} = \theta_k + \frac{u_{rk} - u_{lk}}{d}$$

whereby $u_r$ and $u_l$ indicate the motion changes at the two wheels of the unit and d indicates the distance between the two wheels. The index k identifies the discrete condition. For the unit AE, the system equation therefore has the general form:

$$x_{k+1} = f_k(x_k, u_k) + v_k \quad (2)$$

with $$x_k = \begin{pmatrix} x_k \\ y_k \\ \theta_k \end{pmatrix} \quad (3)$$

$$u_k = \begin{pmatrix} u_{rk} \\ u_{lk} \end{pmatrix} \quad (4)$$

whereby x references the system condition (configuration), u references the input variables and v references an arbitrary disturbance.

The recursive estimate of the system condition uncertainty P, also referred to as co-variance, thus reads as follows:

$$P_{k+1} = \Delta f_x P_k \Delta f_x^T + \Delta f_{uk} U_k \Delta f_{uk}^T + V_k \quad (5)$$

with $$\Delta f_x = \begin{pmatrix} 1 & 0 & -\frac{u_{rk}+u_{lk}}{2} \sin(\theta_k) \\ 0 & 1 & \frac{u_{rk}+u_{lk}}{2} \cos(\theta_k) \\ 0 & 0 & 1 \end{pmatrix} \quad (6)$$

and $$\Delta f_{uk} = \begin{pmatrix} \frac{1}{2}\cos(\theta_k) & \frac{1}{2}\cos(\theta_k) \\ \frac{1}{2}\sin(\theta_k) & \frac{1}{2}\sin(\theta_k) \\ \frac{1}{d} & -\frac{1}{d} \end{pmatrix} \quad (7)$$

When a Gaussian distribution is thereby assumed for the estimated error, then an ellipsoid derives for the uncertainty distribution. Smith, supra.

Figure 2:
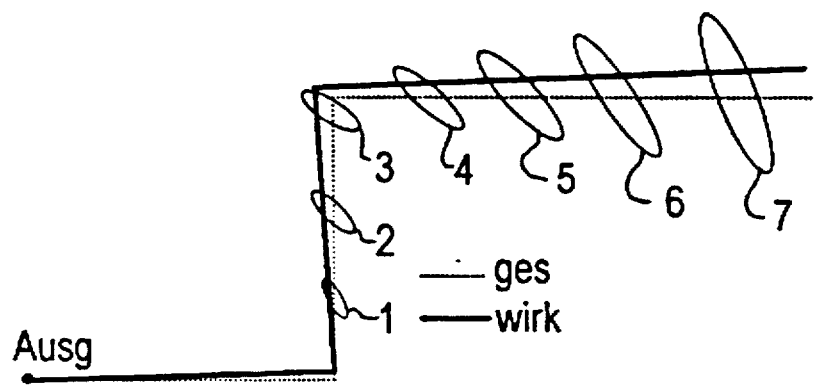
FIG. 2 is an example of a plot illustrating the increasing configuration uncertainty along the route of a unit.

FIG. 2 shows such uncertainty ellipses along a trajectory given a slippage of 5%. The trajectory "ges" here marks the estimated or ideal route of the unit and the trajectory "wirk", by contrast, indicates its real route, with slippage error, proceeding from its starting position "Ausg". These ellipses are continuously numbered via 1–7 in ascending order according to the traversed distance. As FIG. 2 shows, the ellipses become greater and greater with increasing travel distance. A respective ellipse thereby represents a two-dimensional cross section of the three-dimensional uncertainty ellipsoid in the x-y plane. The shape and size of the ellipsoid changes with the robot movement.

The above-described method is suitable for continuous slippage estimating when small wheel changes occur given a known robot position. The wheel positions must thereby be continuously sensed (preferably approximately every 20–50 ms in practice given robot speeds up to 1 m/s).

Figure 3:
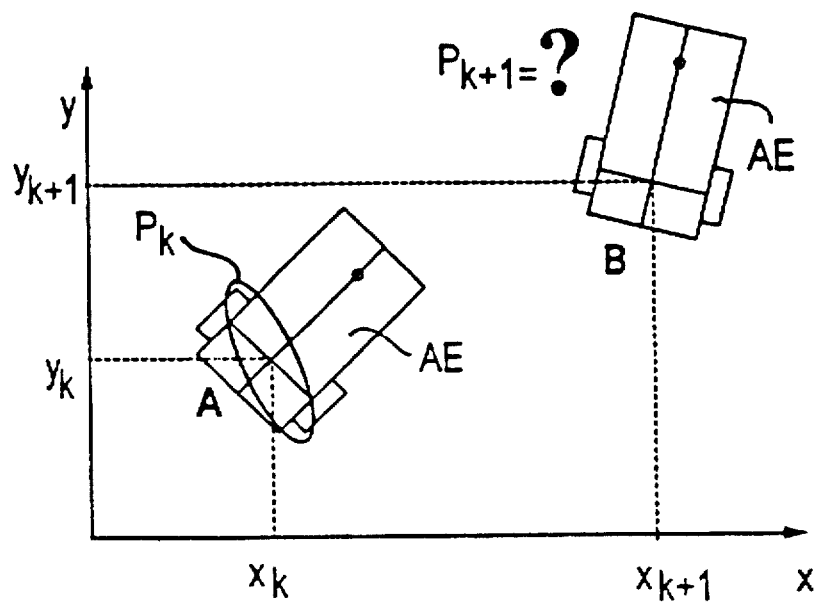
FIG. 3 is a schematic plan view of an autonomous mobile unit experiencing the problems of the prior art, shown in various configurations on a two-dimensional plot.

As shown in FIG. 3, an entirely different situation arises when a robot starting position A is established with appertaining uncertainty and there is interest in the configuration uncertainty of an arbitrary end position B at a distance of, for example, a few meters. This problem occurs in path planning when the uncertainty to a specific destination point is to be calculated before the actual robot travel. The problem of quantitatively determining the configuration uncertainty $P_{k+1}$, at point B with a given uncertainty $P_k$ at point A arises in the conventional path planning of autonomous mobile units such as, for example, in Bauer, supra.

Figure 4:
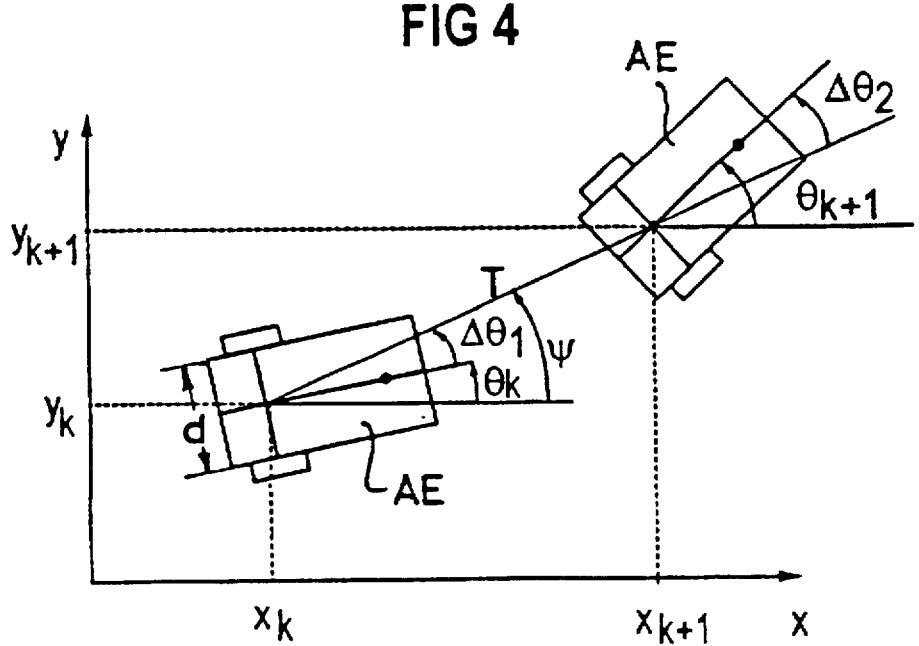
FIG. 4 is a schematic plan view of an autonomous mobile unit operating according to the present invention, shown in various configurations on a two-dimensional plot.

FIG. 4 illustrates the inventive solution. The inventive method described below supplies a realistic uncertainty estimate for any arbitrary end position when a starting position and the uncertainty thereof are known.

The basic idea of the invention is that the uncertainty at an arbitrary end position may be made. An important goal in the realization of the method for estimating the uncertainty was comprised in obtaining realistic uncertainty values close to practice with relatively little calculating outlay.

Since the distance actually traveled or yet to be traveled between starting and end configuration is not known, only a "best-case" estimate for the slippage can, for example, be provided, i.e., it is assumed, for example, that the robot selects a path between the two configurations that is beneficial and shortest in terms of slippage. When the robot moves very unbeneficially, for example not on the shortest path and potentially on a serpentine path, then, of course, the real slippage can be greater.

By contrast to (1), the motion equations at time (k+1) are:

$$x_{k+1} = x_k + T_k \cos(\Psi_k) \quad (8)$$

$$y_{k+1} = y_k + T_k \sin(\Psi_k)$$

$$\theta_{k+1} = \theta_k + \Delta\theta_k$$

with $$T_k = \sqrt{(x_{k+1}-x_k)^2 + (y_{k+1}-y_k)^2} \quad (9)$$

$$\Psi_k = \theta_k + \Delta\theta_{1k} = a\tan\frac{y_{k+1}-y_k}{x_{k+1}-x_k}$$

$$\Delta\theta_k = \Delta\theta_{1k} + \Delta\theta_{2k}$$

For solving the problem, as shown in FIG. 4, the inventive method discloses the division of the overall motion or imaginary absolute motion path into three phases.

An adequate trajectory or motion path between the end and starting configuration must be determined in order to estimate the motion uncertainty. The wheel motions that are absolutely necessary for the uncertainty determination can then be derived with this trajectory. Such a trajectory can be inventively described as follows (also see equations (9) and (10)):

a) rotation by $\Delta\theta_1$ b) Translation by T c) Rotation by $\Delta\theta_2$.

This procedure can be substantiated as follows: the robot will normally not travel in eclipsed or truncated motions (rotation translation) but move on a circular trajectory. With the method disclosed herein, however, the uncertainty to be anticipated can be effectively estimated, as trials have shown.

However, it should always be taken into consideration in the uncertainty estimating that the slippage at the wheels is not predictable. It is in fact probable that a specific, systematic slippage is present, for example when traveling curves or given different wheel sizes; however, there is no sense in exactly identifying this. It can occur at any time in an unknown environment that the robot travels, for example, over floor irregularities such as, for example, thresholds or edges of carpets that can critically falsify, for example, the robot configuration. Lacking exact slippage models, a Gaussian distribution of slippage is therefore advantageously assumed in determining a prescribed slippage. The standard deviation is selected relatively great, i.e., greater than the "normal slippage" on the smooth floor, in order to be able to take these unpredictable and unknown occurrences into consideration.

After the individual rotations and the translations have been identified according to equations (9) and (10), the respective wheel motions of the individual phases must be identified. This occurs as follows:

Phase a) Rotation by $\Delta\theta_1$

Valid in the first rotation is:

$$\Delta\theta_l = \frac{u_{ra}-u_{la}}{d}, \quad u_{ra} = -u_{la} \quad (10)$$

$$u_{ra} = \frac{\Delta\theta_1}{2} d$$

$$u_{la} = -\frac{\Delta\theta_1}{2} d$$

Phase b) Translation by T
The following is valid in the translation:

$$T = \frac{u_{rb} + u_{lb}}{2}, \quad u_{rb} = u_{lb} \tag{11}$$

$$u_{rb} = u_{lb} = \frac{T}{2}$$

Phase c) Rotation by $\Delta\theta_2$
Valid for the second rotation is:

$$\Delta\theta_2 = \frac{u_{rc} - u_{lc}}{d}, \quad u_{rc} = -u_{lc} \tag{12}$$

$$u_{rc} = \frac{\Delta\theta_2}{2} d$$

$$u_{lc} = -\frac{\Delta\theta_2}{2} d$$

Equation (9) can thus be written in the following way:

$$_{k+1} = x_k + \frac{u_{rb} + u_{lb}}{2} \cos\left(\theta_k + \frac{u_{ra} - u_{la}}{d}\right) \tag{13}$$

$$_{k+1} = y_k + \frac{u_{rb} + u_{lb}}{2} \sin\left(\theta_k + \frac{u_{ra} - u_{la}}{d}\right)$$

$$_{k+1} = \theta_k + \frac{u_{ra} - u_{la}}{d} + \frac{u_{rc} - u_{lc}}{d}$$

Then deriving for the overall uncertainty of the system condition is:

$$P_k \Delta f_x^T + \Delta f_{xa} U_{\Delta\theta} \Delta f_{xa}^T + \Delta f_{xb} U_T \Delta f_{xb}^T + \Delta f_{xc} U \tag{14}$$

with $$\Delta f_x = \begin{pmatrix} 0 & 0 & -T\sin(\Psi) \\ 0 & 1 & T\cos(\Psi) \\ 0 & 0 & 1 \end{pmatrix} \tag{15}$$

and $$\Delta f_{xa} = \begin{pmatrix} -\frac{T\sin(\Psi)}{d} & \frac{T\sin(\Psi)}{d} \\ \frac{T\cos(\Psi)}{d} & -\frac{T\cos(\Psi)}{d} \\ 1/d & -1/d \end{pmatrix} = \frac{\partial f_x}{\partial u_a} \tag{16}$$

as well as $$\Delta f_{xb} = \begin{pmatrix} \frac{\cos(\Psi)}{2} & \frac{\cos(\Psi)}{2} \\ \frac{\sin(\Psi)}{2} & \frac{\sin(\Psi)}{2} \\ 0 & 0 \end{pmatrix} = \frac{\partial f_x}{\partial u_b} \tag{17}$$

and $$\Delta f_{xc} = \begin{pmatrix} 0 & 0 \\ 0 & 0 \\ 1/d & -1/d \end{pmatrix} = \frac{\partial f_x}{\partial u_c} \tag{18}$$

The following uncertainties are assumed for the uncertainties at the wheels in every phase:

$$U_k = \begin{pmatrix} \sigma_{ur}^2 & 0 \\ 0 & \sigma_{ul}^2 \end{pmatrix} \tag{19}$$

It is also necessary to identify the wheel motion uncertainties for the individual phases. Given a real robot, however, there is no pure rotation or translation. There is also a minute translation in every rotation and vice versa. Therefore, this interaction should preferably also be explicitly taken into account in the uncertainty determination. The following uncertainties were heuristically assumed for the individual phases:

Phase a)

$$\sigma_{ura}^2 = k_1^2(|u_{ra}| + k_2 T)^2 \tag{20}$$

$$\sigma_{ula}^2 = k_1^2(|u_{la}| + k_2 T)^2$$

Phase b)

$$\sigma_{urb}^2 = k_1^2(|u_{rb}| + k_3 |\Delta\theta|)^2 \tag{21}$$

$$\sigma_{ulb}^2 = k_1^2(|u_{lb}| + k_3 |\Delta\theta|)^2$$

Phase c)

$$\sigma_{urc}^2 = k_1^2(|u_{rc}| + k_4 T)^2 \tag{22}$$

$$\sigma_{ulc}^2 = k_1^2(|u_{lc}| + k_4 T)^2$$

When a "standard slippage" of 5% is assumed, i.e. a translational error of 5 cm is assumed given a travel distance of 1 m, then:

$$\frac{|\Delta\theta_1|}{|\Delta\theta_1| + |\Delta\theta_2|}, \text{ when } |\Delta\theta_1| = 0 \text{ then } \infty \tag{23}$$

$$\frac{|\Delta\theta_2|}{|\Delta\theta_1| + |\Delta\theta_2|}, \text{ when } |\Delta\theta_1| = 0 \text{ then } \infty$$

FIG. 4 explains the problem that, due to the three-wheel kinematics, derives given application of the inventive method to a unit traveling in reverse. When the robot travels in reverse, i.e.

$$\Psi - \theta_k > \pi/2 \tag{24}$$

the rotatory part of the motion is, for example, roughly overestimated since the equations (9) and (10) assume that the robot is looking in the direction of travel during the translation phase. The following substitutions in equations (9) and (10) must preferably be therefore implemented given travel in reverse:

$$\Psi \rightarrow \pi - \Psi \tag{25}$$

$$\Delta\theta_1 \rightarrow \pi - \Delta\theta_1$$

$$\Delta\theta_1 \rightarrow \pi - \Delta\theta_1$$

As FIG. 6 shows, the configuration uncertainties proceeding from a starting position of the unit can be evaluated at various end positions both for forward travel as well as for travel in reverse in that the motion trajectories 1–5 are resolved according to the inventive method. After following application of the equations, one obtains the appertaining slippage and, in conjunction with a higher-ranking route planning, an advantageous motion trajectory can thus be selected.

The individual steps of the inventive method can be described, for example, in summary as follows:

1) From an arbitrary starting and end configuration, the individual rotations and the translation of the overall motion can be calculated with (9) and (10).

2) The individual wheel motions can be identified for every individual motion phase with (11) through (13).

3) The uncertainties of the wheel motions can be identified with equations (21) through (24).

4) The end configuration uncertainty can be identified when with (15) through (20).

5) If the robot should move in reverse while traveling, the calculations must be implemented with the substitutions from (25).

The new method for estimating slippage thereby offers the numerous advantages:

(a) With one calculating operation, i.e. very quickly, a statement is possible about the slippage over a longer distance. With traditional methods, the distance to be traversed would have to be divided into many small sub-distances and the respective slippage would have to be defined therefor;

(b) Slippage modeling is possible both given forward travel as well as travel in reverse; and (c) The interaction between rotation and translation is explicitly considered.

As a result, calculating time is saved.

This method advantageously enables—by itself—the prior planning of robot trips taking the configuration uncertainty caused by slippage into consideration. No such method has previously been disclosed.

The measurement series calculated in experiments for these five exemplary trips 1–5 shows that the inventive estimation method supplies adequate results. These results are shown in Table 1.

TABLE 1

Experimental Results

| Trip | End Config- Starting uration (x, y, θ) (x, y, θ) | | Slippage at End Config- uration Given Continuous Uncertainty Estimation Along the Path ($\sigma_x$, $\sigma_y$, $\sigma_\theta$) | Slippage at End Configuration Given Single-Time Calculation with the Inventive Method ($\sigma_x$, $\sigma_y$, $\sigma_\theta$) |
|---|---|---|---|---|
| 1 | (0; 0; 0) | (50; 0; 0) | (1,81; 3,57; 2,22) | (1,92; 3,72; 2,34) |
| 2 | (0; 0; 0) | (50; 50; 0) | (3,64; 3,24; 3,10) | (3,93; 3,53; 3,39) |
| 3 | (0; 0; 0) | (−50; −50; 45) | (4,67; 3,78; 3,08) | (4,82; 3,96; 3,33) |
| 4 | (0; 0; 0) | (0; 50; 90) | (4,92; 2,37; 4,19) | (3,61; 1,69; 2,64) |
| 5 | (0; 0; 0) | (0; 50; 90) | (3,44; 1,40; 2,49) | (3,61; 1,69; 2,64) |

The uncertainties in the inventive estimating method in fact are somewhat higher than given the continuous estimating along the traveled path but fundamentally reflect the correct tendency of the configuration uncertainty. The higher values arose because extremely pessimistic values were assumed for the parameters of the equations (20) through (22).

Given application of the method disclosed in Bauer, supra, the main concern is finding the most beneficial successor configuration. The absolute uncertainty values are of subordinate significance. It may be clearly seen from Table 1 that the trip to end position 1 yields the least increase in uncertainty since this is a matter of straight-ahead travel without rotation.

In trips 4 and 5, the slippage estimation with inventive method yields identical estimates since the same end configurations are also targeted. Since trip 4, however, is longer and is therefore poorer "in terms of slippage estimating", the continuous estimating along the path yielded greater uncertainty values.

Figure 7:
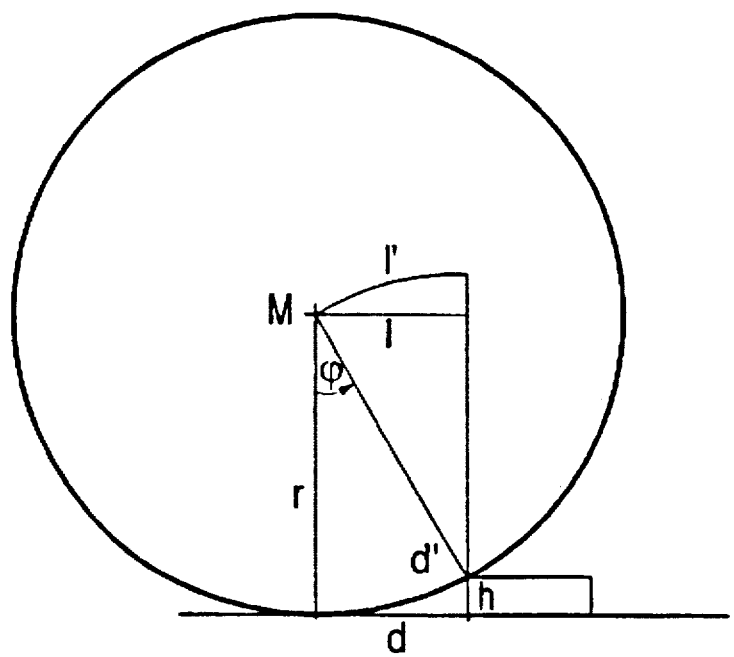
FIG. 7 is a schematic side elevation of a wheel meeting an obstacle, dimensionally illustrating an example occurrence of an obstacle presenting a potential positional error which is correctable according to the present invention.
Figure 8:
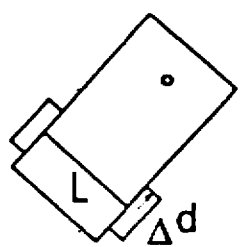
FIG. 8 is a schematic plan view of an autonomous mobile unit experiencing the situation of FIG. 7.

FIGS. 7 and 8 are intended to illustrate how a position error arises when a wheel of the unit travels over an unknown obstacle. The influence on the position estimation is thereby to be shown when a wheel, here shown as a sub-portion R, travels over a small obstacle. The error that has arisen thereby falls, for example, in the category of "slippage errors".

In FIG. 7, a wheel is just beginning to move over an unknown obstacle having a height h. The following relationship is thereby valid:

$$r-h=r\cos(\phi) \text{ when } h \leq r \qquad (26)$$

$$d = r \sin$$

$$d' = r\phi$$

$$l = d$$

$$l' = d'$$

In order to implement the horizontal, translational relative motion 1 of the wheel axis, the wheel axis must traverse the path 1'. At the same time, the wheel thereby traverses the path d'. When only one wheel travels over an obstacle, a path change $\Delta d$ derives for this wheel:

$$\Delta d = 2 \cdot |d - d'| \qquad (27)$$

The factor 2 derives from the fact that the wheel must travel up onto the obstacle and then back down. This path change causes an angular error $\Delta\theta$ in the position identification according to (1) of:

$$\Delta\theta = \frac{\Delta d}{L} \qquad (28)$$

Exemplary Calculation:

$$\begin{aligned} r &= 6 \text{ cm} \\ h &= 1 \text{ cm} \\ L &= 30 \text{ cm} \end{aligned} \qquad (29)$$

$$\rightarrow \cos(\phi) = \frac{5}{6}, \phi = 0,586$$

$$\rightarrow d = 3,316$$

$$\rightarrow d' = 3,514, \Delta d = 0,394$$

$$\rightarrow \Delta\theta = 0,013[\text{rad}] = 0,75°$$

When, thus, a wheel having the radius of 6 cm travels over a 1 cm threshold, an angular error of 0.75° derives. In, for example, following straight-ahead travel over the dist=10 m, this angular error causes a translational error $\Delta T = \text{dist} \cdot \sin(\Delta\theta)$ of approximately 13 cm.

It should be understood that various changes and modifications to the preferred embodiments will be apparent to those skilled in the art. Such changes and modifications may be made without departing from the spirit and scope of the present invention and without diminishing its attendant advantages. Therefore, the appended claims are intended to cover such changes and modifications.

What is claimed is:

1. A method for calculating slippage of an autonomous mobile unit with three-wheel kinematics, the method comprising the following steps:

a) predicting a cumulative overall slippage to be incurred in traversing a travel distance from a starting point to a destination point along an imaginary absolute motion path of the unit, the imaginary absolute motion path including:

a first rotation of the unit of the starting point by a first rotational angle selected such that the unit is directed toward the destination point after the first rotation;

forward travel of the unit of a distance from the starting point to the destination point; and a second rotation of the unit at the destination point at a second rotational angle selected such that the unit assumes a rotational position required at the destination point after the second rotation;

b) calculating an overall slippage per wheel of the unit based on at least one distance-dependent prescribed slippage whereby the imaginary travel distance of each wheel is calculated based on dimensions between wheels of the unit in conjunction with three-wheel kinematics and is multiplied by the prescribed slippage.

2. The method according to claim 1, further comprising:

subtracting the first and the second rotational angle from $\pi$ for travel of the unit in reverse.

3. The method according to claim 1, wherein the prescribed slippage is weighted with a Gaussian distribution.

4. The method according to claim 3, wherein the Gaussian distribution having a standard deviation greater in amount than a maximum value of the Gauss curve in order to cover uncertainties in the real travel execution.

5. The method according to claim 4, wherein the standard deviation is greater than the normal slippage on a smooth floor.

6. The method according to claim 1, wherein the distance between starting point and destination point is at least a length of the unit.

7. A method for route planning of an autonomous mobile unit, whereby sub-jobs to be implemented and to be planned by the unit are defined by cost functions, the method comprising:

monitoring a position uncertainty of the unit with at least one sub-job; and calculating an overall slippage per wheel of the unit based on at least one distance-dependent prescribed slippage wherein an imaginary absolute travel distance of each wheel is calculated based on dimensions between wheels of the unit in conjunction with three-wheel kinematics and is multiplied by the prescribed slippage.

8. A method for route planning of an autonomous mobile unit, whereby sub-jobs to be implemented and to be planned by the unit are defined by cost functions, the method comprising:

correcting a position uncertainty of the unit with at least one sub-job; and calculating an overall slippage per wheel of the unit based on at least one distance-dependent prescribed slippage wherein an imaginary absolute travel distance of each wheel is calculated based dimensions between wheels of the unit in conjunction with three-wheel kinematics and is multiplied by the prescribed slippage.

* * * * *